United States Patent [19]

Kneefel

[11] 4,072,946

[45] Feb. 7, 1978

[54] METHOD AND APPARATUS FOR MEASURING THE DISTANCE BETWEEN TWO STATIONS

[76] Inventor: Wim Bernard Samuel Maria Kneefel, Koningin Astrid Boulevard 56, Noordwijk, Netherlands

[21] Appl. No.: 712,053

[22] Filed: Aug. 6, 1976

Related U.S. Application Data

[63] Continuation of Ser. No. 397,518, Sept. 17, 1973, abandoned.

[30] Foreign Application Priority Data

Sept. 26, 1972 Netherlands .......................... 7212991

[51] Int. Cl.² .......................... G01S 9/08; G01S 9/56
[52] U.S. Cl. .............................. 343/12 R; 343/6.5 R; 343/13 R
[58] Field of Search ............ 343/6.5 R, 6.5 LC, 13 R, 343/12 R (U.S. only)

[56] References Cited

U.S. PATENT DOCUMENTS

| | | | |
|---|---|---|---|
| 2,427,523 | 9/1947 | Dolberg et al. | 343/5 R |
| 3,117,317 | 1/1964 | Kenyon | 343/13 R |
| 3,270,342 | 8/1966 | Stemmer | 343/13 R |
| 3,298,024 | 1/1967 | Böhm | 343/13 R X |
| 3,720,468 | 3/1973 | Skagerlund | 356/4 |
| 3,730,628 | 5/1973 | Wolcott et al. | 343/12 R X |
| 3,757,324 | 9/1973 | Litchford | 343/6.5 LC X |
| 3,772,688 | 11/1973 | Smit et al. | 343/6.5 LC |
| 3,792,471 | 2/1974 | Kingsbury | 343/6.5 LC |

OTHER PUBLICATIONS

"Webster's Third New International Dictionary", 1965, p. 1182.

*Primary Examiner*—Malcolm F. Hubler
*Attorney, Agent, or Firm*—Lowe, King, Price & Markva

[57] ABSTRACT

A method and system for determining the distance between two stations interconnected through a carrier wave connection for data transmission by frequency modulation (FM) or phase modulation (PM) and, if necessary, transferring the data concerning the distance determined. At least one of the two stations is movable and each station comprises a transmitter, a receiver and a transceiver antenna for said FM or PM data transmission. During operation the antennas are interlocked. The carrier wave transmitted by the first station and being normally FM or PM modulated by data signals is interrupted a number of times in this station. Upon detection of each one of these interruptions, the second station introduces a similar, corresponding interruption into the carrier wave transmitted by this second station. The carrier wave is normally also FM or PM modulated by data signals. The period of time between the transmission and reception of the associated interruptions is measured in the first station as a measure of the distance between the stations.

1 Claim, 4 Drawing Figures

METHOD AND APPARATUS FOR MEASURING THE DISTANCE BETWEEN TWO STATIONS

BACKGROUND OF THE INVENTION

This is a continuation of copending U.S. application, Ser. No. 397,518 filed Sept. 17, 1973, now abandoned.

The present invention relates to a method of transferring data between two stations at least one of which is movable. Each one of the stations comprises a transmitter, a receiver and a transceiver antenna. During operation, the antennas of the stations are interlocked and a carrier wave connection is present between the stations.

It is an object of the present invention to determine the distance between the two stations by means of the carrier wave connection present therebetween and, if desired, to transfer the data concerning the distance determined. The carrier wave is normally FM or PM modulated by data signals not related to the distance between the stations. The distance measurement according to the present invention has the advantages over prior distance measurement methods that the required accuracy and a lower sensitivity to interferences are achieved in a simpler manner. Also, the system for applying this method is arranged in a simpler manner than the respective prior systems, operates rapidly and requires little power.

SUMMARY OF THE INVENTION

According to the present invention, for determining the distance between the stations the carrier wave transmitted by a first station is interrupted a number of times in this first station. The carrier wave is normally FM or PM modulated by data signals not related to said distance upon detection of each one of these interruptions a similar, corresponding interruption is introduced in the second station into the carrier wave transmitted by this second station. The second carrier wave may also be FM or PM modulated by data signals not related to said distance. The period of time between the transmission and reception of the respective associated interruptions is measured in the first station.

A characteristic signal may be transmitted by the first station prior to each interruption. Thus, the chances are eliminated that the second station responds to an interruption that is not produced in the first station but, for example, is caused by an interference.

A system for applying the above method comprises a transmitter, a receiver and a transceiver antenna. Here the problem may arise that during the interruption due to crosstalk in this station, interfering signals occur at the edges of the interruption. To eliminate the occurrence of such signals, according to the present invention, is the first station the reception of signals by the antenna of this station is inhibited by an inhibiting signal during a period of time equal to the duration of the characteristic signal, the duration of an interruption and an interval corresponding with the minimal distance range plus the transmission delay time.

This problem may also occur in the second station. To eliminate this drawback, according to the present invention, in the second station the reception of interference signals due to crosstalk by the antenna of this station is inhibited by a first inhibiting signal during a portion of the duration of each interruption. By means of this inhibiting signal, the interference signal occurring at the leading edge of the interruption is eliminated. The interference signal occurring at the trailing edge of the interruption has essentially no detrimental effect on the proper operation of the system. According to the present invention, this signal may be eliminated as in the second station. The reception of the remaining portion of the interference signals is inhibited by a second inhibiting signal.

For applying the above method, the present invention provides a system wherein one station comprises a CW generator whose output is connected, on the one hand, through a modulator for producing the interruptions and a circulator to an antenna and, on the other hand, to a mixer means connected to the circulator and an IF amplifier. The IF amplifier is connected through a detector to a generator for generating the characteristic signals. The latter generator is further connected to the modulator and to a counter means connected to a time base generator. The other station comprises a CW generator whose output is connected, on the one hand, through a modulator for producing the interruptions and a circulator to an antenna and, on the other hand, to a mixer means connected to the circulator and an IF amplifier. The IF amplifier is connected through a detector, a means for decoding the characteristic signals and a gate to the modulator. The detector is also directly connected to the gate.

In the distance measurement according to the present invention, preferably use is made of the trailing edge of the interruption. Here, the problem may occur that the edges of an interruption will in actual practice be slightly inclined. Consequently, the threshold level of the measurement will not always have the proper reference value in the case of an intensity variation of the signal transferred. To solve this problem, according to the present application, a detector is provided including two transistors whose collector resistances are in the ratio of 1 to 2.

BRIEF DESCRIPTION OF DRAWINGS

Other objects of this invention will appear in the following description and appended claims, reference being made to the accompanying drawings forming a part of the specification wherein like reference characters designate corresponding parts in the several views.

DESCRIPTION OF SPECIFIC EMBODIMENTS

Figure 1:
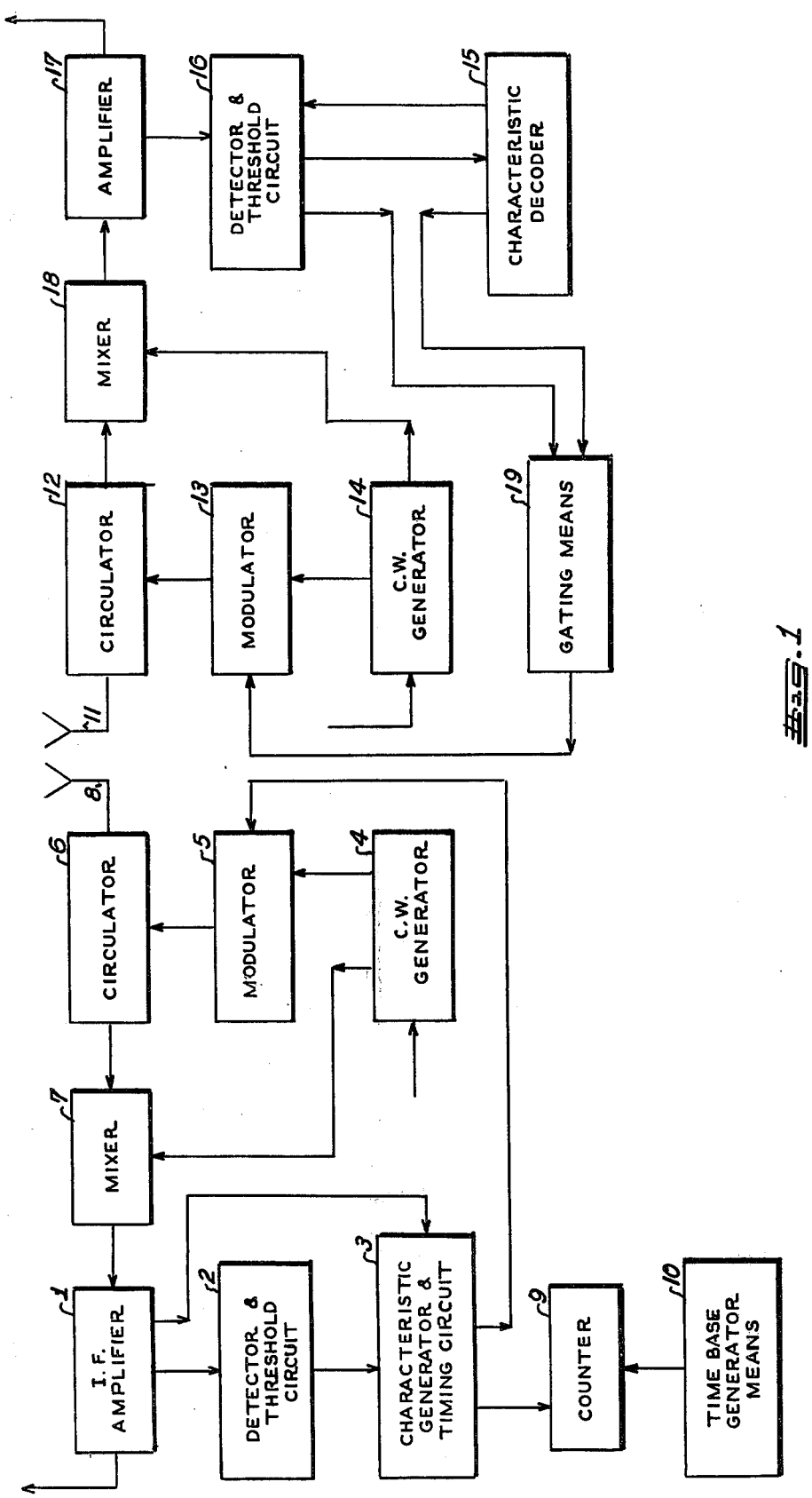
FIG. 1 shows a block diagram of a system for applying the method according to the present invention.

As appears from FIG. 1, the system includes two stations. In the embodiment shown, the station on the left-hand side is assumed to be a mobile station, for example a ship. The station shown on the right-hand side is assumed to be a stationary station, for example an onshore station. However, the present invention is not restricted to this arrangement. For example, both stations may be mobile.

A carrier wave connection is present between the respective antennas 8 and 11 of the two stations. In the subject embodiment, this carrier wave connection consists of a continuous carrier wave connection, which normally can be modulated either in frequency or in phase with data not related to the distance between the stations.

The mobile station comprises a so-called CW generator 4 and the stationary station comprises a CW generator 14 for producing the carrier wave. The generator 4 is connected through a modulator 5 and a circulator 6 to the antenna 8. The generator 14 is connected through a modulator 13 and a circulator 12 to the antenna 11.

The generator 4 is further connected to a mixer 7 connected, on the one hand, to the circulator 6 and, on the other hand, to an intermediate frequency amplifier 1. The IF amplifier 1 is connected through a detector and a threshold circuit 2 to a so-called characteristic generator and timing circuit 3, which will be described in detail below. The characteristic generator is coupled to the modulator 5.

The automatic gain control signal schematically shown on the left-hand side of FIG. 1 can be used to interrupt the distance measurement when the signals received become so weak that no accurate distance measurement can be guaranteed any longer due to the then poor signal-to-noise ratio.

The characteristic generator 3 is further connected to a counter 9 connected to a time base generator means 10. The time base generator means 10 produces a pulse train whose cycle corresponds with the unit of length wherein the measurement is performed. The counter 9 together with the time base generator means 10 constitutes a measuring instrument for the system. The generator 4 further comprises a terminal whereto the data is to be transferred can be applied. This terminal is schematically shown in FIG. 1.

In the stationary station, the generator 14 is connected to the antenna 11 as described above and to a mixer 18, which is connected both to the circulator 12 and an amplifier 17. The latter is connected through a detector 16 to a characteristic decoder 15.

The detector 16 and the characteristic decoder are both connected to a gating means 19 whose output is coupled to the modulator 13. Also in the stationary station, the generator 14 comprises a terminal whereto data can be applied, as schematically shown. An additional connection is provided between the characteristic decoder 15 and the detector 16, wherethrough specific control signals may be applied to the detector, as will be elucidated below.

In accordance with the present invention, the system described above is to be used to measure the distance between the two stations. The distance is measured without interfering with the transmission of data not related to said distance. The system is operated as follows.

The carrier wave present between the two stations is not exclusively used to determine the distance therebetween nor to possibly transfer the information concerning this distance. That is, the carrier wave first serves to transmit all kinds of different information such as conversations between the two stations. This information can be present on the carrier wave in the form of a frequency or phase modulation. The continuous carrier wave transferred by the antenna 8 to the antenna 11 being FM or PM modulated is periodically interrupted by the modulator 5 in the mobile station. These interruptions all have the same configuration. This is shown at $a$ in the time diagram of FIG. 2.

The measurement is essentially based on the fact that this interruption, upon receipt in the stationary station, results in the introduction of a similar, corresponding interruption of the carrier wave transferred from the stationary station by the antenna 11 to the antenna 8 of the mobile station. In the mobile station, the period of time between the transmission of the interruption and the reception of the corresponding interruption is measured as a measure of the distance then present between the two stations.

It should be emphasized that in the above situation, the carrier wave is FM or PM modulated by data signals not related to the distance between the stations. At the same time the carrier wave is interrupted for measuring the distance.

An interruption may occur due to an interference during the carrier wave communication between the two stations. This is an interruption which has not been initiated by the mobile station. Consequently, the stationary station will introduce a corresponding interruption in response thereto, which will be transferred to the mobile station resulting in an incorrect measurement in this station.

Figure 2:
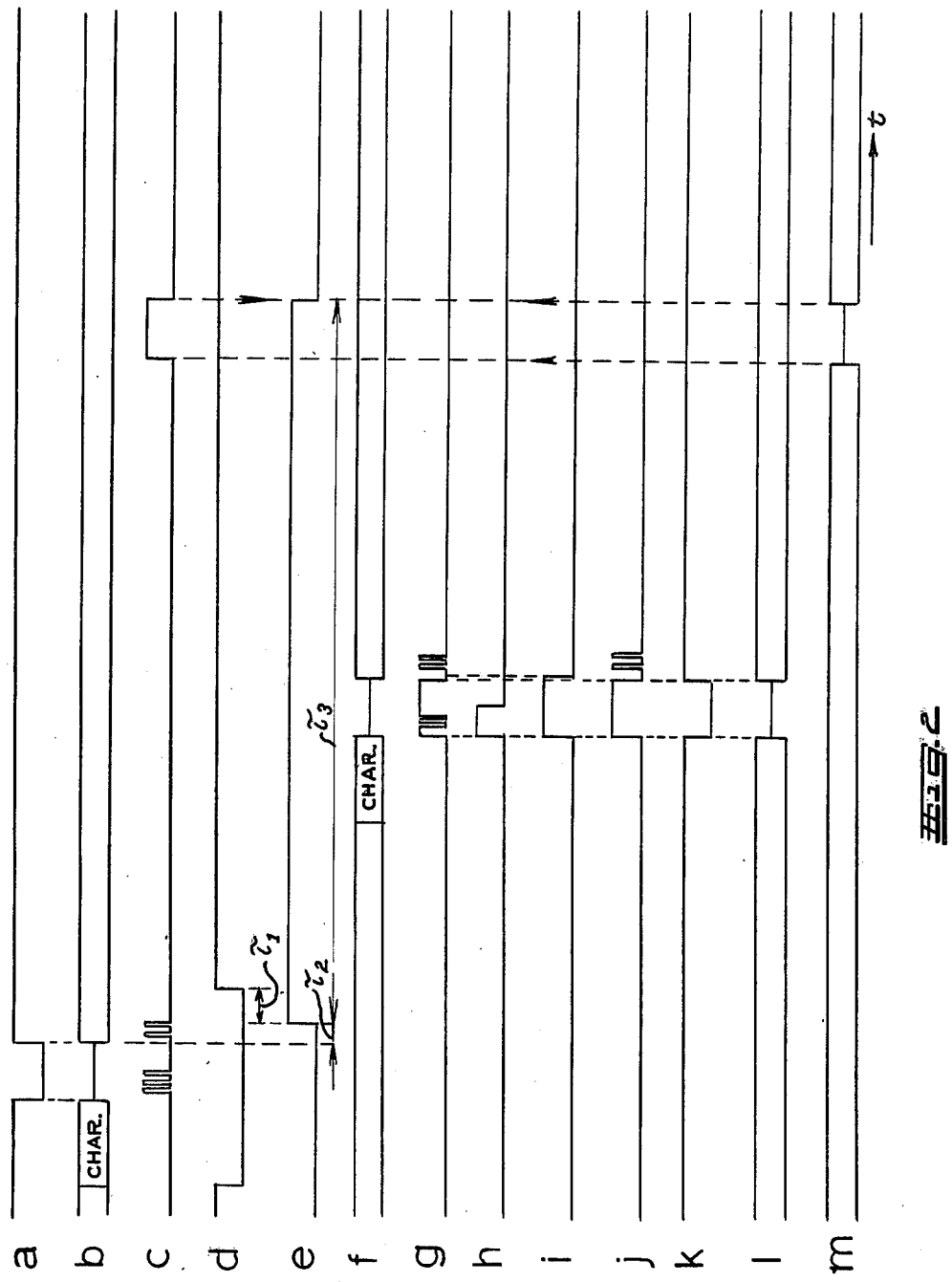
FIG. 2 shows a time diagram of the different signal waves occurring in the system.

According to the present invention, this drawback is eliminated when a so-called characteristic signal is transmitted along with each interruption, as shown at $b$ in FIG. 2. The characteristic signal, in its simplest form, may consist of a pulse or a pulse train. The waveform shown at $b$ is essentially the output signal of the modulator 5. The stationary station will respond by introducing an interruption only upon receipt of an interruption from the mobile station that is preceded by such a characteristic signal. To eliminate the above drawback, each interruption transmitted from the stationary station also will have to be preceded by such a characteristic signal.

In the transfer of such interruptions of a continuous carrier wave signal, yet another problem may occur. Due to the aforementioned arrangement of the system, interfering signals will occur both in the mobile and in the stationary station upon the occurrence of the edges of the interruption due to crosstalk. The interfering signals are shown at $c$ and $g$ in FIG. 2, signal $c$ applying to the mobile station and signal $g$ applying to the stationary station.

To suppress these interfering signals in the mobile station, the reception of signals by the antenna of this mobile station is inhibited during a predetermined interval by an inhibiting signal. This inhibiting signal is shown at $d$ in FIG. 2. The inhibiting signal is produced by the characteristic generator and timing circuit 3. It appears from $d$ that the length of this inhibiting signal is eual to the duration of the characteristic signal, as shown at $b$, the duration of the interruption, as shown at $a$, and a period of time including $\tau_1$ and $\tau_2$, $\tau_1$ being the minimal distance measuring range and $\tau_2$ depending on the inherent delay of the components of the system.

As stated in the above, the interfering crosstalk occurs also in the stationary station, as shown at $g$. However, substantially simultaneously with the reception of an interruption transmitted from the mobile station, a corresponding interruption is produced that is to be transmitted to the mobile station. It is essentially impossible to take the same measure to suppress this interference as in the mobile station, i.e., the use of a de-actuation of relatively long duration, as shown at $d$ in FIG. 2 for the mobile station.

Consequently, a different measure should be taken in the stationary station. As shown at $h$ in FIG. 2, in the stationary station a first inhibiting signal is produced by the characteristic decoder 15. This first signal is of limited duration and is just sufficient to suppress the interfering signals caused by the leading edge of the interruption. This signal is applied to the detector and threshold circuit 16. The transfer of this inhibiting signal from the characteristic decoder 15 to the detector 16 in the stationary station through the rightmost connection between these two components is schematically shown in FIG. 1.

As appears from j in FIG. 2, the interfering signal caused by the trailing edge of the interruption is still present. This interfering signal has no detrimental effect on the proper operation of the system. However, this interfering signal may be eliminated by using the gating means 19. A gating pulse as shown at i in FIG. 2 is applied from the characteristic decoder 15 to the gating means 19. In response thereto, the gating means 19 applies a signal as shown at k in FIG. 2 to the modulator 13.

As a result thereof, a signal as shown at l in FIG. 2 will occur at the output of the modulator 13. Finally, the waveform applied to the amplifier 1 of the mobile station is shown at m in FIG. 2. The interruption is transposed by means of dashed lines on the right-hand side of FIG. 2 to line e of this Figure. A portion of line e is indicated by $\tau_3$, which therefore defines the actual transmission delay time of the interruption in the system. This delay time is equal to the quotient of twice the distance between the stations and the propagation speed of the waves. Consequently, $\tau_3$ is a measure for the distance between two stations.

Although the interruption is shown in FIG. 2 as one having fully vertical edges, this will not be the case in actual practice. The edges will actually be slightly inclined. This implies that when during the distance measurement the intensity of the signal transferred varies, the measuring point on the edges will no longer constitute a proper point of reference for the measurement in the case of a constant threshold level.

The automatic volume control of the system wherein the distance measuring device is applied may be unable to keep the signal sufficiently constant with respect to a constant reference level. This drawback can be eliminated by arranging the detectors such that the relative reference value is adapted to the remaining signal fluctuations.

Figure 3:
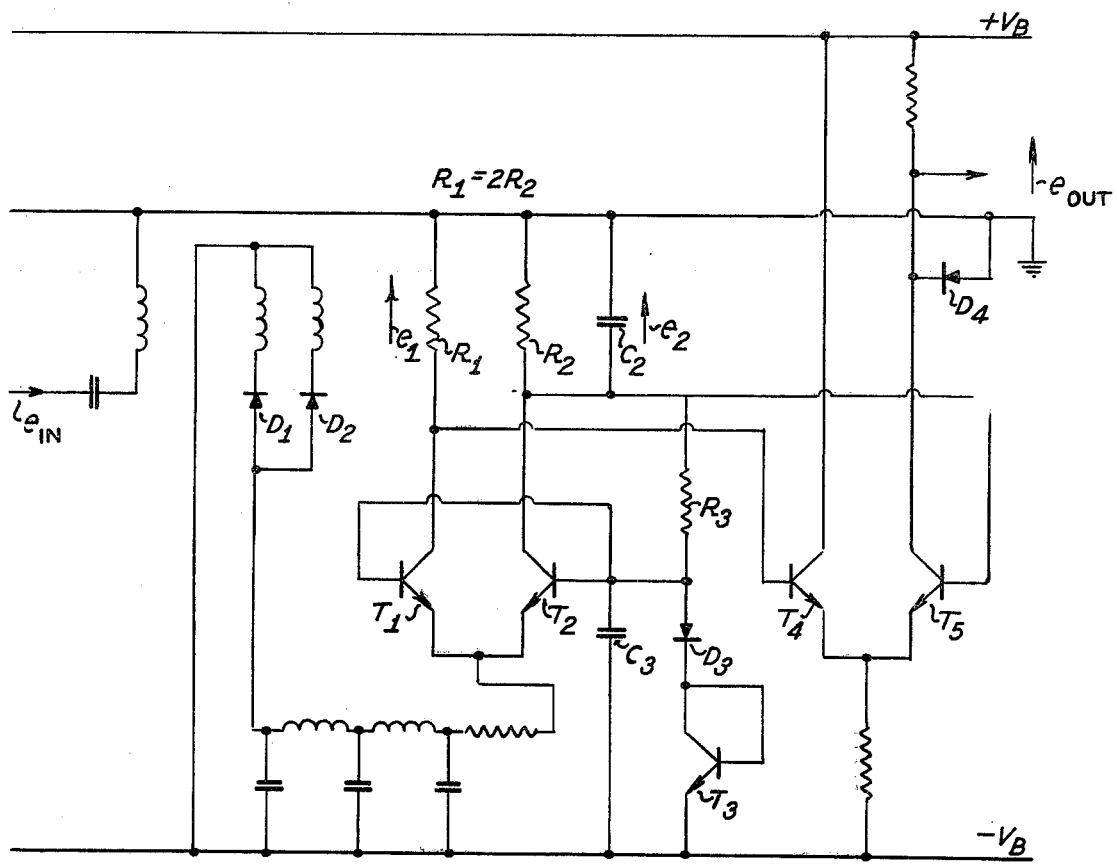
FIG. 3 shows a detailed diagram of the detector used in the above system for maintaining the measuring threshold at a constant level.

FIG. 3 shows a detailed diagram of the detector and threshold circuit 2 shown in FIG. 1. The input signal $e_{in}$ with suppressions is applied to the left-hand side of the circuit as measuring modulation. The components $R_2$, $R_3$, $D_3$, $C_3$ and $T_3$ are selected to bias the transistors $T_1$ and $T_2$ such that the same current traverses $T_1$, $T_2$ and $R_3$ when the input signal $e_{in}$ is continuously absent.

As the base currents of $T_4$ and $T_5$ are negligible, the bias voltages across $R_1$ and $R_2$ will be equal in the absence of the input signal when, according to the invention, $R_1$ is selected to have a value twice that of $R_2$. However, when an input signal is present, the detector output current will be evenly distributed over $T_1$ and $T_2$ and as $R_1 = 2R_2$, the signal component of the voltage $e_1$ will be twice the signal component of the voltage $e_2$, which constitutes the actual threshold voltage.

Normally $T_5$ will conduct and $T_4$ will be cut off as a result of $e_1$ and $e_2$. Due thereto the output voltage $e_{out}$, which is partly determined by the clamping diode $D_4$, will have a value that is substantially equal to 0 volts.

Figure 4:
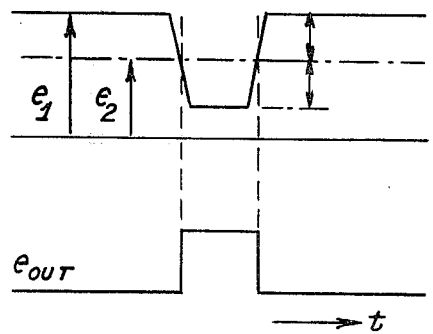
FIG. 4 shows two time diagrams associated with the detector shown in FIG. 3.

During a suppression in $e_{in}$, the signal component of $e_1$ will disappear, while the relative threshold value of $e_2$ is maintained by means of the integrator circuit $R_2C_2$. As soon as the voltage $e_1$ exceeds the threshold value, the transistors $T_4$ and $T_5$ are actuated, as a result whereof a positive pulse appears at the output. This is shown in the time diagrams of FIG. 4.

In addition to the distance data, azimuth data may also be transferred over the communication path between the two stations, which permits the system to be used as a location determining system.

While the method and apparatus for measuring the distance between two stations has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. Apparatus for measuring the distance between two continuous data link stations at least one of which is movable, comprising:
   a. a first carrier wave generator at said first station and including an input terminal for receiving the data to be transferred, and first and second output terminals,
   b. a first modulator having first and second input terminals and an output terminal, said first input terminal being connected with said first output terminal of said first carrier wave generator,
   c. a first antenna at said first station,
   d. first circulator means connected with said first antenna and including an input terminal connected with the output terminal of said first modulator, and an output terminal,
   e. a first mixer having a first input terminal connected with the output terminal of the first circulator means, a second input terminal connected with the second output terminal of the first carrier wave generator, and an output terminal,
   f. an IF amplifier including an input terminal connected with the output terminal of said first mixer, and first, second and third output terminals,
   g. detector and threshold circuit means including an input terminal connected with the first output terminal of said IF amplifier, and an output terminal,
   h. characteristic generator and timing circuit means including a first input terminal connected with the output terminal of said detector and threshold circuit means, a second input terminal connected with the second output terminal of said IF amplifier, and a first output terminal connected with the second input terminal of said first modulator,
   i. counter means having a first input terminal connected with the second output terminal of said characteristic generator and timing circuit, and second input terminal,
   j. time base generator means connected with the second input terminal of said counter means,
   k. a second carrier wave generator at said second station and including a data input terminal and first and second output terminals,
   l. a second modulator having a first input terminal connected with the first output terminal of said carrier wave generator, a second input terminal, and an output terminal,
   m. a second antenna at said second station,
   n. second circulator means connecting the output terminal of said second modulator with said second antenna, said second circulator means including an output terminal, o. a second mixer including a first input terminal connected with the output terminal of said second circulator means, a second input terminal connected with the second output terminal of said second carrier wave generator, and an output terminal,
p. a second IF amplifier having an input terminal connected with the output terminal of said second mixer, and first and second output terminals,
q. a second detector and threshold circuit having a first input terminal connected with the first output terminal of said second IF amplifier, a second input terminal, and first and second output terminals,
r. characteristic decoder means including an input terminal connected with the first output terminal of said second detector and threshold circuit, a first output terminal connected with the second input terminal of said detector and threshold circuit, and a second output terminal, and
s. gating means including first and second input terminals connected with the second output terminals of said detector and threshold circuit and said characteristic decoder means, respectively, and an output terminal connected with the second input terminal of said second modulator,
t. said first modulator being operable to produce an interruption in the carrier wave generated by said first carrier wave generator and also a characteristic signal which occurs prior to the interruption, and
u. the characteristic decoder and said second detector and threshold circuit being operable to detect said interruption and to introduce a corresponding interruption in the carrier wave of said second carrier wave generator, which second interruption is detected in said first detector and threshold circuit to afford a measure of the distance between said stations.

* * * * *

UNITED STATES PATENT OFFICE
CERTIFICATE OF CORRECTION

Patent No. 4,072,946            Dated February 7, 1978

Inventor(s) Wim Bernard Samual Maria Kneefel

It is certified that error appears in the above-identified patent and that said Letters Patent are hereby corrected as shown below:

On the title page, insert

--Assignee: Christiaan Huygenslaboratorium B.V.
            Noordwijk, the Netherlands Signed and Sealed this Seventh Day of November 1978

[SEAL]

Attest:

RUTH C. MASON
Attesting Officer

DONALD W. BANNER
Commissioner of Patents and Trademarks